United States Patent [19]

Takada

[11] 4,053,117
[45] Oct. 11, 1977

[54] AUTOMATIC LOCKING SAFETY BELT RETRACTOR

[75] Inventor: Juichiro Takada, Tokyo, Japan

[73] Assignee: Takata Kojyo Co., Ltd., Tokyo, Japan

[21] Appl. No.: 685,967

[22] Filed: May 13, 1976

[30] Foreign Application Priority Data

May 17, 1975 Japan ................... 50-057929

[51] Int. Cl.² .................. A62B 35/02; B65H 75/48
[52] U.S. Cl. ............................... 242/107.4 A
[58] Field of Search ............ 242/107.4 R, 107.4 E; 280/744–747; 297/388; 74/575–578

[56] References Cited

U.S. PATENT DOCUMENTS

| | | | |
|---|---|---|---|
| 3,578,260 | 5/1971 | Kell | 242/107.4 A |
| 3,834,646 | 9/1974 | Heath | 242/107.4 A |
| 3,836,171 | 9/1974 | Hayashi et al. | 242/107.4 R X |

Primary Examiner—Stanley N. Gilreath
Assistant Examiner—John M. Jillions
Attorney, Agent, or Firm—Wolder & Gross

[57] ABSTRACT

An automatic braking safety belt retractor includes a shaft journalled to a bracket and spring biased in a belt retraction rotating direction. Affixed to the shaft is a take-up reel, and first and second ratchet wheels with the same number of teeth. A first spring retracted pawl is movable into engagement with the first ratchet wheel and a tooth carrying actuating member is slidable along a path tangent to the second ratchet wheel between a retracted first position with the tooth disengaged from the second ratchet wheel, a second position with the tooth engaging the second ratchet wheel, and a ratchet wheel advanced third position. A bracket mounted acceleration sensing pendulum upon actuation shifts the actuating member to its ratchet wheel engaging second position, the belt extraction rotation of the second ratchet wheel advances the actuating member which is coupled to the first pawl to advance the first pawl into engagement with the first ratchet wheel. The ratchet wheels are so angularly related and the actuating member and first pawl member are so related that the first pawl always advances into engagement with the first ratchet wheel deeply between successive teeth.

9 Claims, 4 Drawing Figures

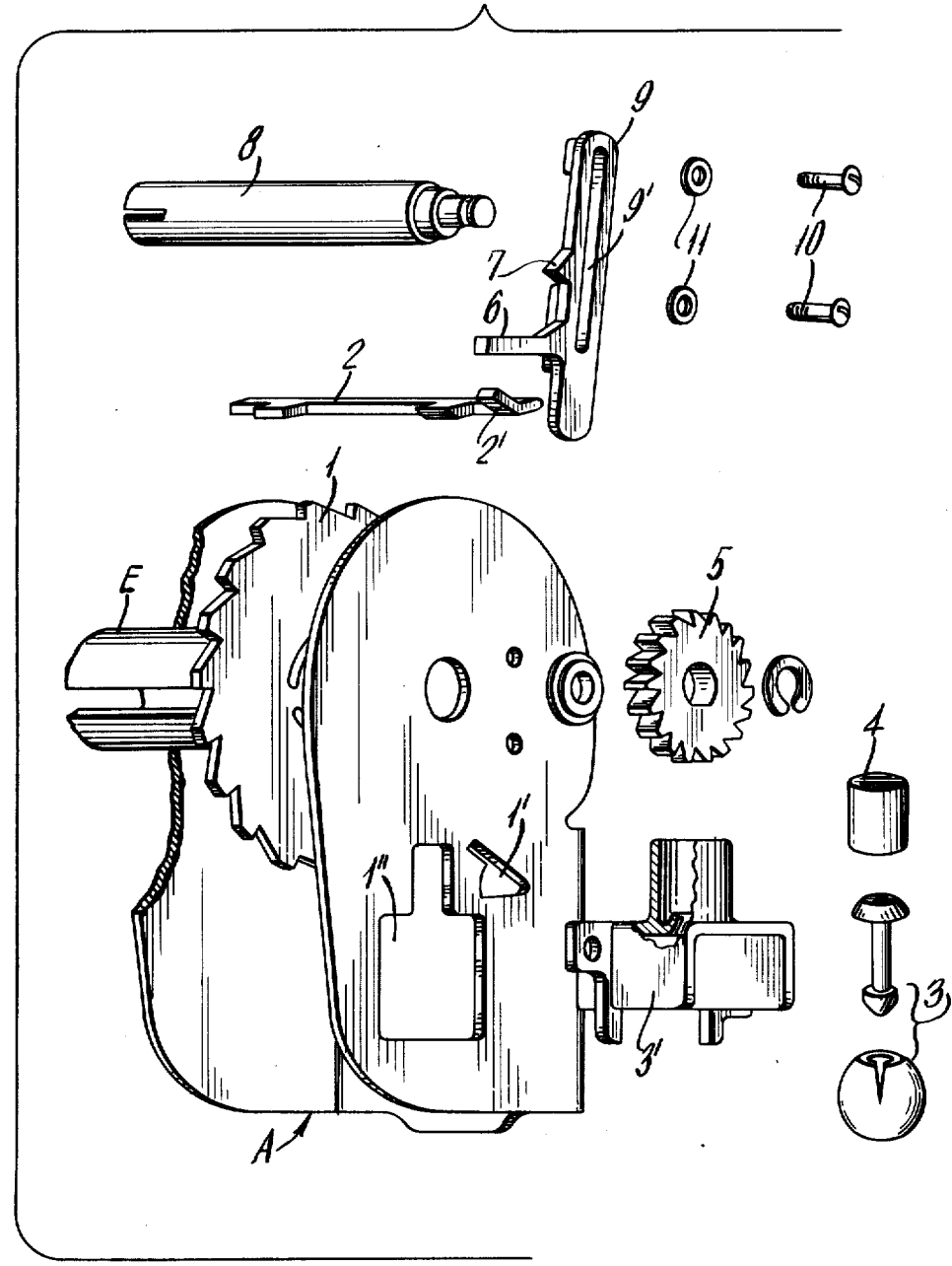

AUTOMATIC LOCKING SAFETY BELT RETRACTOR

BACKGROUND OF THE INVENTION

The present invention relates generally to improvements in safety belt retractor devices and it relates more particularly to an improved acceleration responsive, automatic locking safety belt retractor reel.

A conventional seat safety belt retractor reel device which is commonly employed in automobiles includes a reel which is spring biased to rotate in a belt retraction direction and a mechanism for locking the reel against belt extraction rotation in response to a predetermined positive or negative acceleration, that is, an acceleration or deceleration which occurs consequent to a collision or other emergency conditions of the car.

In acceleration responsive automatic locking reels of the above type, however, the acceleration sensing mechanisms are very sensitive so that even under normally encountered driving conditions the frequency of operation is very high and repeated many times in a short interval. In a locking mechanism in which the extraction of the seat belt is locked by means of the engagement of a ratchet wheel by a pawl, the top of the pawl tooth is occasionally concurrently located at the same position as that of a tooth of the ratchet wheel. Since the speed of rotation of the ratchet wheel is enhanced by the withdrawal or extraction force of the seat safety belt, the tooth top of the ratchet wheel outwardly repels the tooth top of the pawl to thereby prevent the engagement between the pawl and ratchet wheel. Under such conditions, it requires a considerable period of time for the pawl to resume its normal position and thus again achieve engagement with the ratchet wheel. In the course of this period, a considerable length of the seat belt is extracted from the retractor, thereby preventing the proper and optimum operation of the seat belt system.

Moreover, in extreme cases, the tooth top of either the pawl or the ratchet wheel is damaged, and the subsequent engagement there between becomes imperfect.

The conventional automatic locking safety belt retractor accordingly possesses important drawbacks and disadvantages. It is frequently unreliable and subject to rapid wear and damage and otherwise leaves much to be desired.

SUMMARY OF THE INVENTION

It is a principal object of the present invention to provide an improved safety belt retractor device.

Another object of the present invention is to provide an improved acceleration actuated automatic locking safety belt retraction reel.

Still another object of the present invention is to provide an improved automatic locking safety belt retractor reel having a braking mechanism including a ratchet wheel and locking pawl in which improper engagement between the pawl and ratchet wheel is prevented.

A further object of the present invention is to provide a device of the above nature characterized by its high reliability, ruggedness, absence of self-damage during operation, simplicity, and versatility.

The above and other objects of the present invention will become apparent from a reading of the following description taken in conjunction with the accompanying drawings which illustrate a preferred embodiment thereof.

In accordance with the present invention, there is provided an acceleration, positive or negative, responsive automatic locking retractor which obviates the above described drawbacks and disadvantages of the conventional safety belt retractor of the subject type. The retractor device of the present invention includes a first relatively high strength ratchet wheel sufficient to bear the maximum load applied by the safety belt attendant to an emergency and a second toothed or ratchet drive wheel for advancing a normally retracted brake pawl into engagement with the first ratchet wheel, the second ratchet wheel being of relatively low strength. The first and second wheels are coaxially affixed to a common shaft to which the belt take-up reel is affixed.

An acceleration sensing device includes an acceleration motivated pendulum which raises a drive member to a predetermined level in response to a predetermined swing of the pendulum. The sensing device drive member functions to advance a slidably mounted actuating member along a path tangential to the drive wheel to bring a tooth on the actuating member into engagement with the toothed drive wheel. Further, as the drive wheel is rotated attendant to the extraction of the safety belt, the drive wheel further advances the slidable actuating member wheel in turn is coupled to and advances the first pawl into engagement with the first ratchet wheel to lock the reel against belt extraction rotation.

Both of the first and second ratchet wheels have the same number of teeth so affixed to the shaft and angularly related to the actuating member that when the second ratchet wheel advances the actuating member, the tooth top of the pawl never engages or touches a tooth top of the first ratchet wheel, and the engaging operation always starts from a position at a same angle from each tooth such as, for example, at a position P between top and bottom of a tooth. Because of this arrangement, the leap-out or ejection action never occurs between the tooth top of the first ratchet wheel and that of the pawl as is commonly observed in the conventional retractor. Moreover, the actuating slide member is arranged to slide in the tangential direction of the second ratchet wheel and eliminates the leap-out of the tooth of the second ratchet wheel from the engaging section or tooth of the actuating member thereby to ensure the proper braking of the reel and the safety of the passenger in the car.

If desired, a locking mechanism responsive to extraction of the seat belt may also be provided on the outside of the reel mounting frame or bracket in order to thereby form a composite retractor integrally with the present mechanism. Alternatively, another locking mechanism which restrains the winding force of the seat belt during normal driving conditions of the car may be combined with the present mechanism in order to minimize the feeling of pressure of the seat belt. Thus, the present invention provides an acceleration/deceleration responsive retractor which is of simple construction and yet insures high safety.

BRIEF DESCRIPTION OF THE DRAWINGS

FIG. 3 is an exploded perspective view, partially fragmented of the retractor device.

DESCRIPTION OF THE PREFERRED EMBODIMENT

Figure 1:
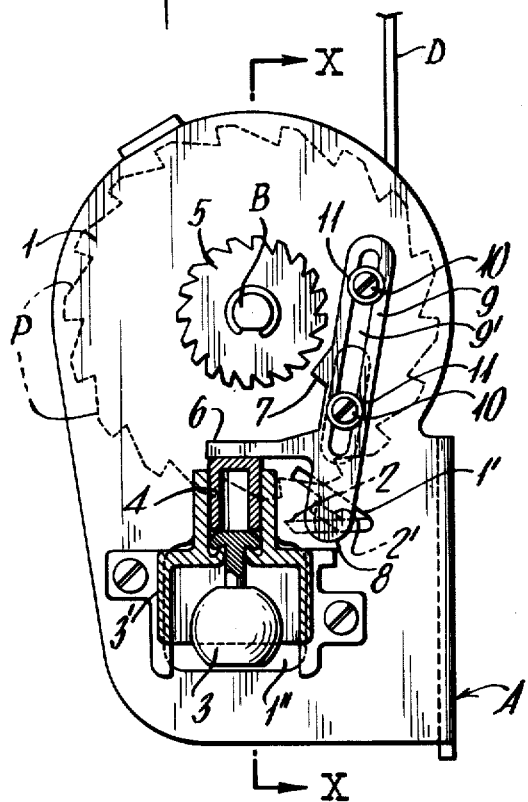
FIG. 1 is a side elevational view, partially fragmented and in section of a retractor device embodying the present invention and shown in a reel released position.
Figure 2:
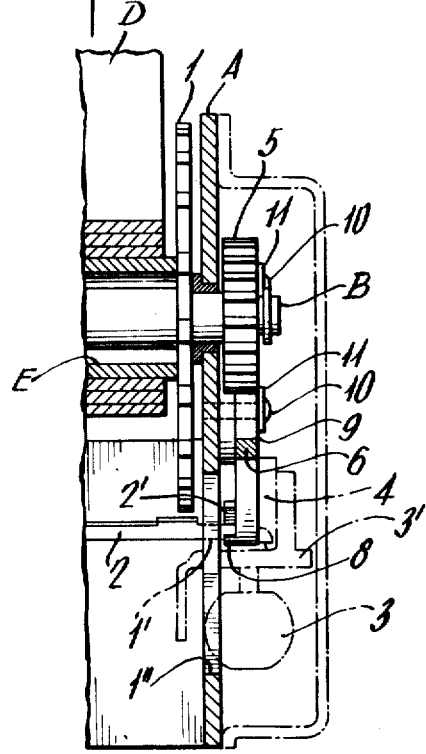
FIG. 2 is a sectional view taken along line X—X in FIG. 1.

Referring now to the drawings which illustrate a preferred embodiment of the present invention, the reference letter A generally designates a U-shaped frame or bracket including a base wall and side walls and suitably mounted to the floor of a vehicle or to the seat structure to support the bracket in a predetermined orientation. A shaft B extends between and journalled to the bracket side walls and is biased, in the known manner, by a spiral spring (not shown) to rotate in a belt retraction rotating direction. One end portion of a seat safety belt D is coupled to wind onto a reel E which is affixed to shaft B between the bracket side walls and which has at opposite ends similar first ratchet wheels 1 of high strength sufficient to withstand the maximum load or impact applied to the ratchet wheels by the belt D.

A pawl 2 includes a cross bar rockably mounted in opposite segment shaped openings 1' formed in the bracket side walls or pivotally coupled thereto by pins or like means so that the pawl 2 is swingable between advanced and retracted positions engaging and disengaging first ratchet wheels 1. An acceleration and tilting sensing member 3 such as a pendulum, a steel ball located on a pan or a downwardly directed conical weight is displaced by a positive or negative acceleration of the vehicle consequent to a collision or other emergency conditions. A support 3' is mounted in a rectangular opening 1'' in one of the bracket side walls and movably supports the sensing member 3. A transmission member or piston 4 is vertically slidable in a sleeve formed on the support 4' and is located in the path of a top cam section formed on sensing member 3 so as to be raised with acceleration sensing movement of sensing member 3.

A second ratchet or peripherally toothed drive wheel 5 of relatively low strength has the same number of teeth as first ratchet wheel 1 and is coaxially affixed to shaft B and is so angularly related to first ratchet wheel 1 that when, as will be hereinafter explained, the drive wheel 5 advances the pawl 2 by way of an actuating member 9 into engagement with the ratchet wheels 1, the pawl 2 effects or initiates engagement with similar positions P relative to the teeth of the first ratchet wheel 1, between successive teeth and not at the top of any of the ratchet wheel teeth.

A pawl actuating member 9 is an elongated bar extending along a path tangential to drive wheel 5 and has a longitudinal slot 9' which is slidably engaged by stepped pins 10 provided with washers 11 so that the actuating member 9 is longitudinally slidable along the face of a bracket side wall between a lower retracted position through an intermediate position to an advanced raised position. The actuating member 9 is provided with a projection or tooth 7 which, in the retracted position of actuating member 9 is out of engagement with drive wheel 5 and engages drive wheel 5 at the intermediate position of the actuating member 9 and remains in engagement with the full advance of actuating member 9.

An arm 6 projects transversely from the actuating member 9 to a position overlying and intercepting the path of transmission member 4 and is so disposed that when the pendulum 3 is swung a predetermined angle corresponding to a predetermined acceleration it raises transmission member 4 and arm 6 sufficiently to raise actuating member 9 to its intermediate position with the tooth 7 engaging the drive wheel 5. Lesser accelerations or tilts will not effect the raising of the actuating member 9 to its intermediate position. A transverse projection or shoulder 8 is formed at the lower end of actuating member 9 and underlies an arm 2' projecting from pawl 2 so that upon the raising of the actuating member 9 from its intermediate to its advanced position, the projection 8 rises to engage and swing arm 2' to swing the pawl 2 into locking engagement with ratchet wheels 1. It should be noted that the sensing member 3 may act directly on arm 6 and the transmission member 4 may thus be obviated.

In addition to the teeth on first and second ratchet wheels 1 and 5 being of the same number, they are so angularly related and so interrelated with the actuating member 9, pawl 2 and pawl arm 2' that advance of the actuating member 9 by the belt extraction rotated drive wheel 5 causes the pawl 2 to engage first ratchet wheels 1 only between successive teeth and not at the top of any ratchet tooth.

Considering the application and operation of the improved mechanism, first, the sensing member 3, as shown in FIG. 1, is a pendulum which is not significantly or effectively displaced until the vehicle acceleration, positive or negative, exceeds a predetermined value. Accordingly, the bottom face of the transmission member 4 coincides with the apex of the sensing member 3 whereby the arm 6 of the actuating member 9 rests on the top face of the transmission arm member 4 which is lowered by the weight of the actuating member 9 in the described embodiment, and the engaging section or tooth 7 of the actuating member 9 is out of contact with the second ratchet wheel 5. In consequence, the connecting section or shoulder 8 of the actuating member 9 is located at the lowermost position, and the pawl 2 is out of engagement with the first ratchet wheel 1 whereby extraction and winding operation of the seat belt D can be freely performed.

For the purpose of simplification of construction, each of the transmission member 4, actuating member 9 and pawl 2 is gravity urged to its lowermost position to be out of engagement with both ratchet wheels 1 and 5 under normal conditions by reason by the weight of the respective members.

Depending upon the mounting position of the retractor, however, it is sometime desirable that the actuating member 9 is located at a position in a tangential direction being approximate to the horizon. In such a case, a part or the whole of the transmission member 4, actuating member 9 and pawl 2 is provided with a biasing force by means of a suitable spring or like means so that they are retracted from both ratchet wheels 1 and 5 under normal condition.

Next, when an acceleration or deceleration is imparted to the car due to a collision or other accident, the sensing member 3 inclines or moves in a direction displaced from plumb whereby the top part thereof raises the transmission member 4. When the transmission member 4 is elevated even in case of slight excess over a predetermined value, the engaging arm 7 of the actuating member 9 is raised to a position where it engages the second ratchet wheel 5, frequently rolling forward by the passenger's body due to a collision causes the extraction of the seat belt D and at the same time, imparts rotationeal torque to both ratchet wheels 1 and 5 in the direction of extraction of the seat belt. Accordingly, the actuating member 9 slides further in the upward direction and swings the pawl 2 towards the engaging position with the first ratchet wheel 1 by means of its coupling shoulder or section 8. Since both of the ratchet wheels 1 and 5 have a same number of teeth and are in synchronous and coaxial rotation, the engaging action of the tooth top of the pawl 2 starts or operates every time at a designed position other than the tooth top of the first ratchet wheel 1, for example, at a predetermined position P, when the second ratchet wheel 5 slidably advances the actuating member 9 upwardly to its predetermined advanced position.

Figure 4:
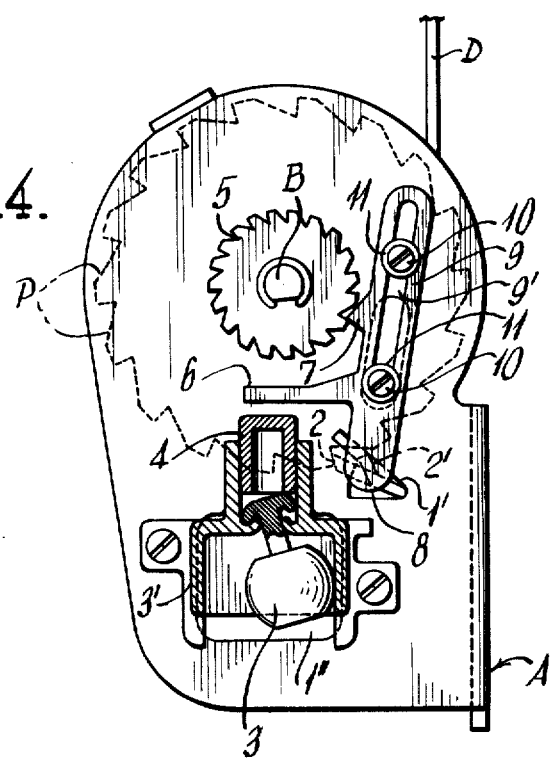
FIG. 4 is a view similar to FIG. 1 but shown in a reel braked position.

Subsequently, as shown in FIG. 4, the tooth top of the pawl 2 engages with the tooth bottom of the first ratchet wheel 1 uniformly and precisely. For this reason, the tooth top of the pawl 2 never touches the tooth top of the first ratchet wheel 1, thereby preventing the tooth top of the pawl 2 from leaping out of engagement which is often observed in the conventional acceleration-responsive retractor.

When the pawl 2 has engaged with the first ratchet wheel 1, extraction of the seat belt D is presented. During the period when the belt extraction force is applied to the belt by reason of the rolling down action of the passenger's body, the engagement of the pawl 2, that is to say, the locking of the belt D is kept even if the sensing member 3 resumes its normal position. Accordingly, the actuating member 9 also is retained at a predetermined stationary position by the second ratchet wheel 5.

Next, when the passenger resumes his normal position, both the ratchet wheels 1 and 5 are turned in the belt winding or retraction direction by the force of the spiral rewind spring whereupon both the pawl 2 and the actuating member 9 resumes their normal positions as shown in FIG. 1.

As explained in the foregoing paragraphs, the acceleration/deceleration-responsive retractor in accordance with the present invention possesses the technical advantage that though simple in its construction, it perfectly eliminates the leap-out of the pawl from the first ratchet wheel and provides a seat belt having improved safety.

While there has been described and illustrated a preferred embodiment of the present invention it is apparent that numerous alterations, omissions and additions may be made without departing from the spirit thereof.

I claim:

1. A safety belt retractor device comprising a belt take-up reel rotatable in opposite belt extraction and belt retraction directions and spring biased to rotate in a belt retraction direction, a first ratchet wheel coaxially rotatable with said reel, a first pawl member movable between a retracted position disengaged from said first ratchet wheel and an advanced position engaging said first ratchet wheel, a peripherally toothed drive wheel coaxially rotatable with said reel, an actuating member including a drive wheel engaging coupling element, means mounting said actuating member for sliding movement along a path proximate the periphery of said drive wheel between a retracted position with said coupling element out of engagement with said drive wheel, an intermediate position with said coupling element engaging said drive wheel and an advanced position, means for moving said first pawl to its advanced position with the movement of said actuating member toward its advanced position and means for moving said actuator member to its intermediate position in response to a predetermined acceleration of said retractor.

2. The retractor device of claim 1 wherein said first ratchet wheel and said drive wheel have the same number of teeth.

3. The retractor device of claim 2 wherein said ratchet wheel and drive wheel are so angularly related and said wheels, actuating member and pawl are so related that said pawl is always advanced into engagement with said ratchet wheel between successive teeth.

4. The retractor device of claim 3 wherein said actuating member is longitudinally slidable along a path substantially tangent to said drive wheel and said coupling element comprises a tooth projecting transversely from said actuating member toward said drive wheel.

5. The retractor device of claim 1 wherein said acceleration responsive means comprises a pendulum and means responsive to the swinging of said pendulum beyond a predetermined position for advancing said actuating member to its intermediate position.

6. The retractor device of claim 4 comprising a U-shaped bracket including side walls and a shaft extending between and journalled to said side walls said ratchet wheel, drive wheel and reel being coaxially affixed to and rotatable with said shaft.

7. The retractor device of claim 6 wherein said drive wheel is located proximate the outside face of a first of said bracket side walls and said actuating member is longitudinally slidably mounted on said outside face.

8. The retractor device of claim 7 wherein said first pawl member includes a cross bar extending between and rockably engaging said bracket side walls and including a pawl element rockable with said cross bar into and out of engagement with said first ratchet wheel and also including a transversely projecting actuating arm, said actuating member including a shoulder movable into engagement with said actuating arm with the advance of said actuating member to rock said pawl member into engagement with said ratchet wheel.

9. In an acceleration-responsive type retractor which includes a U-shaped frame, a shaft mounted to said frame, a reel fitted to said shaft, a belt wound onto said reel and biasing means urging said shaft and reel to rotate in a belt retraction direction, the improvement to said retractor comprising; a first ratchet wheel secured to said shaft, a pawl mounted to a side wall of said frame engageable and disengageable with said first ratchet wheel; a second ratchet wheel having same number of teeth as that of said first ratchet wheel and fitted to said shaft in the proximity of said side wall of said frame and being rotatable in synchronism with said first ratchet wheel, an actuating member, means supporting said actuating member by the side wall of said frame for sliding movement in a tangential direction relative to the circumscribed circle of said second ratchet wheel, said actuating member including a coupling section releasably engageable with said second ratchet wheel to advance said pawl toward engagement with said first ratchet wheel when said coupling section engages with said second ratchet wheel and a displacement member located at the side of said frame and being displaceable in accordance with an acceleration of the retractor, said actuating member being interlocked with said displacement member and being responsive to the displacement thereof so as to thereby advance and engage with said second ratchet wheel so that said pawl engages with said first ratchet wheel to prevent said belt from being extracted.

* * * * *